United States Patent [19]
Wakao

[11] Patent Number: 5,861,131
[45] Date of Patent: Jan. 19, 1999

[54] PROCESS FOR PRODUCING NICKEL HYDROXIDE

[75] Inventor: Shinjiro Wakao, Tokyo-to, Japan

[73] Assignee: Seido Chemical Industry Co., Ltd., Osaka, Japan

[21] Appl. No.: 868,492

[22] Filed: Jun. 3, 1997

[30] Foreign Application Priority Data

Jul. 1, 1996 [JP] Japan ..................................... 8-191392

[51] Int. Cl.$^6$ ..................................................... C01B 13/14
[52] U.S. Cl. ............................................ 423/592; 423/144
[58] Field of Search ..................................... 423/144, 592

[56] References Cited

U.S. PATENT DOCUMENTS

| | | | |
|---|---|---|---|
| 1,167,484 | 1/1916 | Edison | 423/144 |
| 4,954,265 | 9/1990 | Greenberg et al. | 423/140 |
| 5,498,403 | 3/1996 | Shin | 423/594 |

FOREIGN PATENT DOCUMENTS

| | | | |
|---|---|---|---|
| 50-33122 | 3/1975 | Japan | 423/144 |
| 4-68249 | 10/1992 | Japan . | |
| 6-191855 | 7/1994 | Japan . | |
| 8-315822 | 11/1996 | Japan . | |

*Primary Examiner*—Steven Bos
*Attorney, Agent, or Firm*—Kubovcik & Kubovcik

[57] ABSTRACT

The present invention provides a process for producing nickel hydroxide particles characterized by forming nickel hydroxide particles by continuously supplying an aqueous solution containing a nickel salt and an aqueous solution of an amino acid or salt thereof to a reactor at the same time and supplying an aqueous solution of an alkali metal hydroxide to the reactor so as to maintain the pH of the mixture in the reactor at a constant value.

5 Claims, 1 Drawing Sheet

PROCESS FOR PRODUCING NICKEL HYDROXIDE

SPECIFICATION

The present invention relates to a process for producing nickel hydroxide. The nickel hydroxide of the invention is useful, for example, as nickel hydroxide for secondary batteries, especially as a positive electrode material for alkali secondary batteries of the nonsintered type, such as nickel-cadmium secondary batteries and nickel-hydrogen secondary batteries.

The characteristics required of nickel hydroxide for use in nonsintered positive electrodes of alkali secondary batteries, i.e., the characteristics required for exhibiting a satisfactory function as an active substance include a sufficiently high tapping density, great specific surface area and low crystallinity. Nickel hydroxide is used for a nonsintered electrode by mixing a high-molecular-weight binder with nickel hydroxide to prepare a paste and packing the paste into an electrode substrate. If the packing density of nickel hydroxide is low, the electrode has a small amount of the hydroxide incorporated therein and is therefore small in discharge capacity. Further if having high crystallinity and a small specific surface area, the nickel hydroxide will be low in the coefficient of electrochemical use and discharge rate, failing to afford a practically useful electrode.

Efforts have been extensively made to improve and develop processes for producing nickel hydroxide for use in alkali secondary batteries. For example, JP-B-68249/1992 discloses a process wherein an aqueous nickel salt solution, an aqueous alkali metal hydroxide solution and an ammonium ion donor serving as a complexing agent for nickel ion are supplied to a reaction system at the same time while maintaining the reaction system at a constant temperature of 20° to 80° C. and at a constant pH value of 9 to 12 to continuously draw off spherical particles of nickel hydroxide having a particle size range of 2 to 50 μm. The ammonium ion donor is used in an amount of about 0.1 to about 1.5 moles per mole of the nickel salt. However, the process encounters difficulty in preparing satisfactory nickel hydroxide stably.

JP-A-252318/1991 also discloses a process which is substantially the same as the above process and wherein an aqueous nickel salt solution or aqueous solution of a nickel salt, cobalt salt and cadmium salt, an aqueous alkali metal hydroxide solution and an ammonium ion donor are continuously supplied to a reaction system while maintaining the reaction system at a constant temperature of 20° to 80° C. and at a constant pH value of 9 to 12 during the progress of reaction to continuously draw off nickel hydroxide particles or nickel hydroxide particles containing cobalt and cadmium. Nickel hydroxide particles of predetermined particle size distribution or those containing cobalt and cadmium are prepared by decreasing the supply of the ammonium ion donor to the reaction system intermittently for specified periods of time during the reaction or increasing the pH of the reaction system intermittently for specified periods of time.

JP-A-340427/1994 discloses another process which is similar to the foregoing two processes and uses an ammonium ion donor as a complexing agent for nickel. However, this process is characterized by maintaining the mixture in the reactor at a nickel ion concentration of 10 to 100 mg/liter and stirring the mixture with an electric power of at least 0.5 KW per cubic meter of the reactor capacity.

With the above three examples of production processes, the reaction is effected basically by continuously supplying an aqueous nickel salt solution, caustic alkali or like alkali metal hydroxide, and ammonium ion donor to the reaction system at the same time and maintaining the reaction system at a constant temperature of 20° to 80° C. and at a constant pH value of 9 to 12.

The ammonium ion donor usually used in these processes is 10 to 28 wt. % of aqueous ammonia, whereas the aqueous solution is liable to vaporize and requires a device for minimizing the vaporization and the release of the gas from the production apparatus, thus necessitating precautions for holding the apparatus closed and for the maintenance thereof. Moreover, the aqueous solution is likely to release a noxious odor to the outside or to cause corrosion to the apparatus. The vaporization and release of ammonia are further likely to vary the ammonia concentration of the reaction mixture, alter the proper hydroxide forming conditions within narrow limits and adversely affect the density, crystallinity and other properties of the nickel hydroxide formed to impair the stabilized uniform properties of the product.

An object of the present invention is to provide a process for stably producing spherical nickel hydroxide particles which have a high tapping density, great specific surface area and low crystallinity and which are made highly uniform in these properties.

The above and other objects of the invention will become apparent from the following description.

The present invention provides a process for producing nickel hydroxide particles characterized by forming nickel hydroxide particles by continuously supplying an aqueous solution containing a nickel salt and an aqueous solution of an amino acid or salt thereof to a reactor at the same time and supplying an aqueous solution of an alkali metal hydroxide to the reactor so as to maintain the pH of the mixture in the reactor at a constant value.

Examples of nickel salts for use in the aqueous solution containing a nickel salt according to the invention are nickel sulfate, nickel nitrate, nickel chloride, etc., among which nickel sulfate is preferred. Preferably, the nickel salt-containing aqueous solution has a nickel concentration, for example, of 0.5 to 3.5 moles/liter.

In order to obtain nickel hydroxide of higher electrochemical activity, an aqueous solution containing at least one salt selected from among a cobalt salt, cadmium salt and zinc salt can further be added to the nickel salt-containing aqueous solution as a starting material. Examples of cobalt salts are cobalt sulfate, cobalt nitrate, cobalt chloride, etc. Those of cadmium salts are cadmium sulfate, cadmium nitrate, cadmium chloride, etc. Those of zinc salts are zinc sulfate, zinc nitrate, zinc chloride, etc. It is desirable to use the cobalt salt, cadmium salt or zinc salt in an amount, for example, of about 1 to about 5 wt. %, calculated as the metal, based on the metallic nickel.

The amino acid to be used in the present invention is a compound having a carboxyl group, and an amino group and/or a basic group in the molecule, or a salt of the compound. Examples of such salts are alkali metal salts such as sodium salts and potassium salts, and inorganic acid salts such as hydrochlorides.

Examples of useful amino acids are glycine, α-alanine, β-alanine (β-amino acid), valine, serine, glycylglycine, leucine, norleucine, α-aminobutyric acid and like monoaminomonocarboxylic acids, lysine, glutamine, asparagine, arginine, α,β-diaminopropionic acid, α,γ-diaminobutyric acid and like diaminomonocarboxylic acids, glutamic acid, aspartic acid and like monoaminodicarboxylic acids, methionine, cysteine and like sulfur-containing amino acids, proline, histidine and like heterocyclic amino acid, phenylalanine and like aromatic amino acids, etc. Also useful are other acids such as glycine amide (aminoacetamide), picolinic acid and sarcosine.

Of these amino acids, usable are those which are about 6 to about 20 in stability constant (complex formation constant) when forming a complex with nickel ion as will be described below. The stability constant is preferably about 7.0 to about 12.4, more preferably about 7.9 to about 11.1.

The stability constant is now defined as log $(K_1 \cdot K_2)$.

$K_1$: equilibrium constant at which one molecule of amino acid coordinates to nickel ion.

$K_2$: equilibrium constant at which another molecule of amino acid coordinates to nickel ion having one molecule of amino acid coordinated thereto.

Examples of amino acids which are about 7.9 to about 11.1 in log $(K_1 \cdot K_2)$ are glycylglycine, β-alanine, lysine, methionine, arginine, valine, asparagine, glutamic acid, α-alanine and glycine. Examples of amino acids which are about 7.0 to about 12.4 in log $(K_1 \cdot K_2)$ are norleucine, proline and aspartic acid in addition to those given above. Examples of amino acids which are about 6 to about 20 in log $(K_1 \cdot K_2)$ are those exemplified above and further include glycine amide (aminoacetamide), sarcosine, α-aminobutyric acid, leucine, serine, picolinic acid, α,β-diaminopropionic acid, histidine, α,τ-diaminobutyric acid, cysteine, etc. Of these amino acids, especially preferable are glycine, α-alanine, β-alanine, glutamic acid, glycylglycine and salts of these acids. These amino acids are usable singly or in mixture. These amino acids are amphoteric compounds having carboxyl and amino (basic group) in the molecule, and reversibly form a complex with nickel ions, such that when nickel hydroxide nuclei are formed to result in a decrease in the nickel ion concentration around the nuclei, the complex dissociates for the replenishment of nickel ions, whereas when the nickel ion concentration increases with the introduction of the nickel salt aqueous solution, the amino acid forms the complex to thereby inhibit the increase. Thus, the acid produces a buffer effect on marked increase and decrease in the nickel ion concentration.

The molar ratio of the amino acid to the nickel in the reaction system is usually 0.001 to 0.6, preferably 0.005 to 0.5, although the ratio is generally not always the same at different pH values and with different kinds of amino acids. Incidentally, an ammonium ion donor can be used in combination with the amino acid.

In the case where the amino acid is used according to the invention, the molar ratio of the amino acid to nickel can usually be 1/20 to 1/10 of the molar ratio of the conventional processes wherein the ammonium ion donor is used. Thus, the production process of the invention has the feature of being very small in the amount of amino acid consumed. When the amino acid is sparingly soluble in water, the acid can be made to dissolve therein by increasing the pH to 7 to 9.5 with a caustic alkali, or an alkali metal salt of the amino acid is usable.

According to the invention, the residual nickel concentration of the mixture in the reactor is usually about 5 to about 400 mg/liter, preferably about 10 to about 300 mg/liter.

The preferred alkali metal hydroxide for use in the present invention is caustic soda, caustic potash or the like. It is desired that the aqueous solution of the alkali metal hydroxide have a concentration usually of about 2 to about 10 moles/liter, especially about 4 to about 8 moles/liter. It is desired to supply the alkali metal hydroxide to the reactor so that the mixture in the reactor retains a constant pH value, especially an approximately constant value around specified pH within the pH range of 9 to 12. It is desired that the pH be maintained usually at the specified value±0.1.

According to the invention, the reaction temperature is maintained approximately at a specified constant value within the range of 20° to 80° C. The temperature is usually the specified value±2° C., prepferably the specidied value±1° C. The reaction time is usually about 1 to about 50 hours, preferably about 1 to about 10 hours. The reaction is conducted in a desired mode, i.e., batchwise, continuously or semicontinuously.

The liquid to be placed into the reactor before the reaction (referred to as the "initial liquid") may be mere water, but for example, when nickel sulfate is used as the nickel salt, it is effective for forming particles of nickel hydroxide at an accelerated rate to use sodium sulfate as the supply source of sulfate ions and to add to water the sulfate and the amino acid in amounts in accordance with the amount of initial liquid before the reaction. Preferably, the amounts are such that the mixture in the reactor in the steady state has approximately equal sulfate ion and amino acid concentrations, i.e., such that the sulfate ion and amino acid concentrations are maintained at an approximately constant level from the start of the reaction. The concentrations of the initial liquid can be estimated from the concentrations and flow rates of the starting nickel sulfate solution, aqueous amino acid solution and aqueous alkali metal hydroxide solution. Although dependent on the structure of the reactor, the amount of initial liquid is preferably small such that the pH electrode will be immersed therein.

The nickel hydroxide obtained by the present invention is in the form of approximately spherical particles which are 2 to 50 μm, preferably 10 to 30 μm, in size. The hydroxide is 1.5 to 2.2 g/ml, preferably 2.0 to 2.2 g/ml, in tapping density and in the range of 0.8 to 1.25 deg, preferably 0.9 to 1.25 deg, in the half width of the (101) plane which is determined by X-ray diffraction and which is a measure indicating the crystallinity of the nickel hydroxide. The specific surface area of the hydroxide as determined by the BET method is 20 to 70 $m^2$/g, preferably 30 to 70 $m^2$/g.

Figure 1:
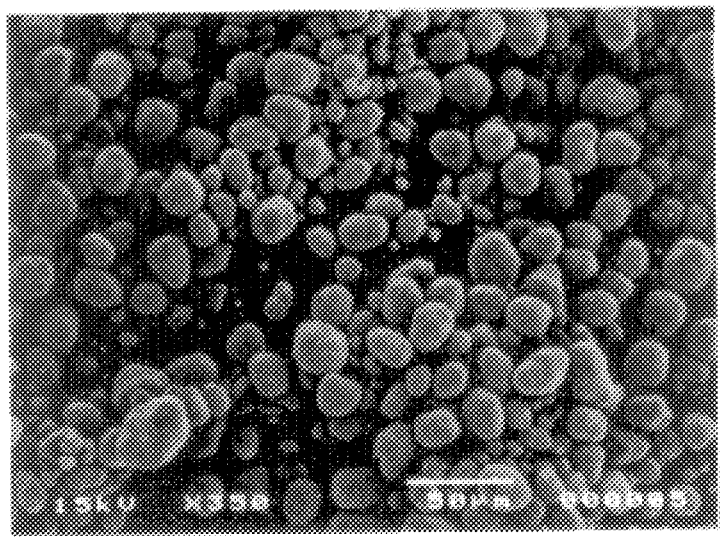
FIG. 1 is a scanning electron photomicrograph showing the structure of nickel hydroxide particles obtained in Example 5.

The invention will be described in greater detail with reference to the following examples.

EXAMPLE 1

Using metering pumps or microsyringes, 2 moles/liter of aqueous nickel sulfate solution and 1 mole/liter of aqueous glycine solution were continuously admitted at rates of 35 ml/hour and 4.90 ml/hour, respectively, into a reactor having a capacity of 250 ml and equipped with overflow tube. At the same time, 6 moles/liter of caustic soda was placed in through a pH controller with vigorous agitation to maintain the mixture at a pH value of 11.0±0.1. The molar ratio of the glycine to the nickel was 0.070, the residence time was 4.0 hours, and the temperature of the mixture was 60°±1° C. Placed into the reactor before the reaction was 50 ml of an initial liquid which contained 11.09 g of sodium sulfate and 3.8 ml of 1 mole/liter of aqueous glycine solution, the amounts being roughly calculated before the start of the reaction. The completion of the reaction was followed by filtration, washing with water and drying. No particular pulverization procedure was necessary. The reaction mixture had a residual nickel concentration of 300 mg/liter. Nickel hydroxide was obtained which was 2.05 g/ml in tapping density, 1.03 deg in the half value width of the (101) plane as determined by X-ray diffraction and 10 to 30 μm in particle size as determined from the particle size distribution obtained by the laser method.

EXAMPLES 2 TO 6

The same procedure as in Example 1 was repeated with the exception of maintaining the pH at 11.1±0.1 or 10.9±0.1 and varying the molar ratio of glycine to the nickel admitted over the range of 0.048 to 0.020. The aqueous nickel sulfate solution used in Example 4 contained cadmium sulfate admixed therewith in the Ni to Cd molar ratio of 1:0.02. The nickel hydroxides obtained were 2.02 to 2.06 g/ml in tapping density and 1.03 to 1.09 deg in the half value width of the (101) plane, hence satisfactory crystallinity. Tables 1 and 2 show the conditions and the properties of the products. FIG. 1 is a scanning electron photomicrograph (SEM, ×350 in magnification) showing nickel hydroxide particles obtained in Example 5.

EXAMPLES 7 TO 13

Figure 2:
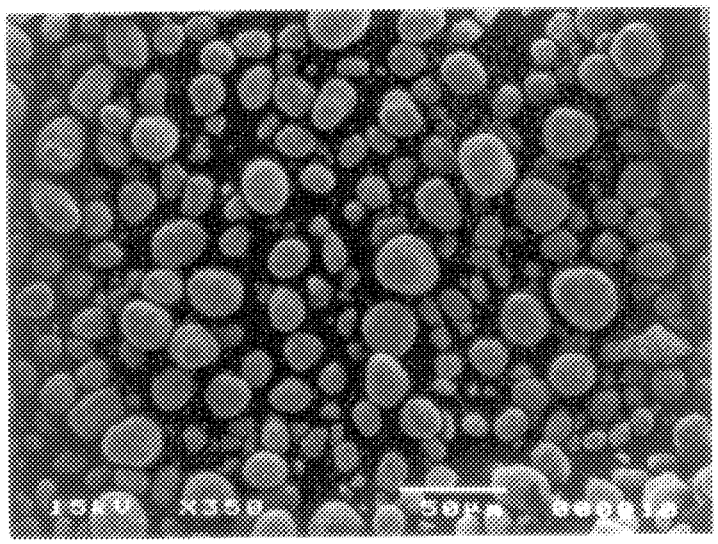
FIG. 2 is a scanning electron photomicrograph showing the structure of nickel hydroxide particles obtained in Example 12.

The same procedure as in Examples 1 to 6 was repeated with the exception of using 1 mole/liter of aqueous DL-alanine solution as an amino acid, maintaining the mixture in the reactor at a pH of 10.8±0.1 or 11.0±0.1 and varying the molar ratio of the DL-alanine to the nickel over the range of 0.070 to 0.038. The nickel concentration of the mixtures in the reactor and the properties of the nickel hydroxides formed were determined. The mixture had varying residual nickel concentrations of 140 to 25 mg/liter. The nickel hydroxides were 2.06 to 2.10 g/ml in tapping density, 1.09 to 1.20 deg in the half value width of the (101) plane and satisfactory. Tables 1 and 2 show the conditions and the properties of the products. FIG. 2 is a scanning electron photomicrograph (SEM, ×350 in magnification) showing nickel hydroxide particles obtained in Example 12.

EXAMPLES 14 to 16

The same procedure as in Examples 1 to 6 was repeated with the exception of using 3 moles/liter of aqueous β-alanine solution as an amino acid, maintaining the mixture in the reactor at a pH of 10.9±0.1 or 11.0±0.1 and varying the molar ratio of the β-alanine to the nickel over the range of 0.25 to 0.18. The residual nickel concentration of the mixtures in the reactor was 25 to 130 mg/liter. Table 2 shows the characteristics of the nickel hydroxides obtained.

EXAMPLE 17

The same procedure as in Examples 1 to 6 was repeated except that 1 mole/liter of aqueous glycylglycine solution was used as an amino acid. The temperature was 60°±1° C., the pH of the mixture in the reactor was 10.9±0.1, the molar ratio of the glycylglycine to the nickel was 0.035, and the residual nickel concentration was 100 mg/liter. Table 2 shows the characteristics of the nickel hydroxides obtained.

COMPARATIVE EXAMPLE 1

The same procedure as in Examples 1 to 6 was repeated except that 7 moles/liter of aqueous ammonia was used in place of the amino acid. The temperature was 60°±1° C., the pH of the mixture in the reactor was 10.8±0.1, the molar ratio of the ammonia to the nickel was 0.50, and the residual nickel concentration was 10 mg/liter. The use of the concentrated aqueous ammonia resulted in variations in the ammonia concentration due to release on vaporization, presenting difficulty in maintaining the molar ratio of the ammonia to nickel ions at a constant value. As will be apparent from Table 2, the product was unsatisfactory in tapping density and in the half value width of the (101) plane.

TABLE 1

| Ex. | Amino acid | pH | Amino acid/nickel molar ratio | Reaction temp. (°C.) |
|---|---|---|---|---|
| 1 | glycine | 11.0 ± 0.1 | 0.070 | 60 ± 1 |
| 2 | glycine | 11.0 ± 0.1 | 0.048 | 60 ± 1 |
| 3 | glycine | 11.0 ± 0.1 | 0.040 | 60 ± 1 |
| 4 | glycine | 11.0 ± 0.1 | 0.034 | 50 ± 1 |
| 5 | glycine | 11.1 ± 0.1 | 0.024 | 60 ± 1 |
| 6 | glycine | 10.9 ± 0.1 | 0.020 | 60 ± 1 |
| 7 | DL-alanine | 11.0 ± 0.1 | 0.070 | 60 ± 1 |
| 8 | DL-alanine | 11.0 ± 0.1 | 0.060 | 60 ± 1 |
| 9 | DL-alanine | 10.8 ± 0.1 | 0.044 | 60 ± 1 |
| 10 | DL-alanine | 10.8 ± 0.1 | 0.042 | 60 ± 1 |
| 11 | DL-alanine | 11.0 ± 0.1 | 0.052 | 60 ± 1 |
| 12 | DL-alanine | 10.8 ± 0.1 | 0.038 | 60 ± 1 |
| 13 | DL-alanine | 11.0 ± 0.1 | 0.042 | 60 ± 1 |
| 14 | β-alanine | 11.0 ± 0.1 | 0.20 | 60 ± 1 |
| 15 | β-alanine | 11.0 ± 0.1 | 0.25 | 60 ± 1 |
| 16 | β-alanine | 10.9 ± 0.1 | 0.18 | 60 ± 1 |
| 17 | glycylglycine | 10.9 ± 0.1 | 0.035 | 60 ± 1 |

| Com. Ex. | complexing agent | pH | Ammonia/nickel molar ratio | Reaction temp. (°C.) |
|---|---|---|---|---|
| 1 | ammonia aq. soln. | 10.8 ± 0.1 | 0.50 | 60 ± 1 |

TABLE 2

| | Residence time (hr) | Nickel concn. (mg/l) | Tapping density (g/ml) | (101)Half width (degree) | Particle size (μm) |
|---|---|---|---|---|---|
| Ex. | | | | | |
| 1 | 4.0 | 300 | 2.05 | 1.03 | 10~30 |
| 2 | 4.1 | 180 | 2.04 | 1.05 | 10~30 |
| 3 | 5.9 | 150 | 2.05 | 1.03 | 10~30 |
| 4 | 6.1 | 80 | 2.02 | 1.07 | 10~20 |
| 5 | 6.1 | 55 | 2.06 | 1.07 | 10~30 |
| 6 | 6.0 | 30 | 2.02 | 1.09 | 10~30 |
| 7 | 5.9 | 125 | 2.10 | 1.10 | 10~30 |
| 8 | 5.9 | 100 | 2.08 | 1.15 | 10~30 |
| 9 | 6.0 | 140 | 2.10 | 1.09 | 10~30 |
| 10 | 6.0 | 130 | 2.08 | 1.09 | 10~30 |
| 11 | 6.0 | 75 | 2.06 | 1.17 | 10~20 |
| 12 | 5.9 | 60 | 2.08 | 1.20 | 10~30 |
| 13 | 6.0 | 25 | 2.06 | 1.09 | 10~20 |
| 14 | 3.7 | 25 | 2.06 | 1.17 | 10~30 |
| 15 | 3.7 | 130 | 2.03 | 1.07 | 10~20 |
| 16 | 4.1 | 80 | 2.00 | 1.06 | 10~20 |
| 17 | 3.8 | 100 | 2.04 | 0.97 | 10~20 |
| Com. Ex. | | | | | |
| 1 | 3.5 | 10 | 1.97 | 0.93 | 10~30 |

EXAMPLE 18

The same procedure as in Example 1 was performed with the exception of using 1 mole/liter of aqueous DL-alanine solution as an amino acid, conducting the reaction at a temperature of 50°±1° C. and at a pH of 11.0±0.1 with a residence time of 6 hours and adjusting the flow rates of 2 moles/liter of aqueous nickel sulfate solution and the DL-alanine solution so as to maintain the molar ratio of the DL-alanine to the nickel at 0.058. The residual nickel concentration of the mixture in the reactor was 300 mg/liter. The nickel hydroxide obtained was 2.04 g/ml in tapping density, 1.19 deg in the half value width of the (101) plane as determined by X-ray diffraction and 10 to 30 μm in particle size as determined from the particle size distribution obtained by the laser method.

EXAMPLE 19

Figure 3:
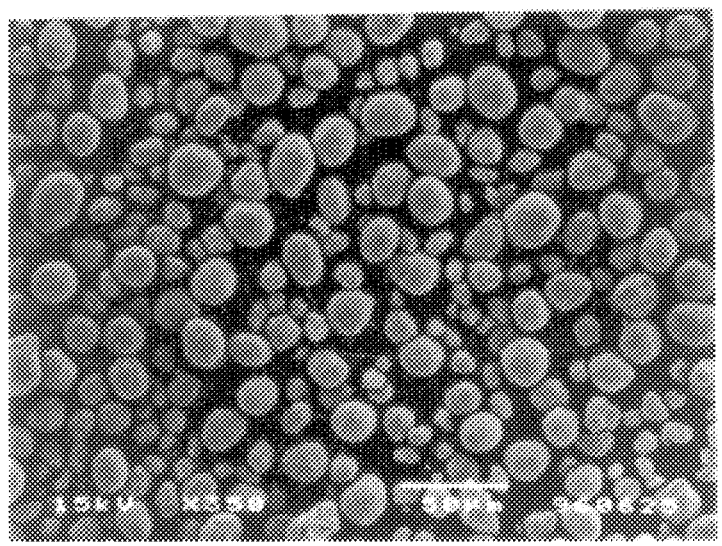
FIG. 3 is a scanning electron photomicrograph showing the structure of nickel hydroxide particles obtained in Example 19.

For use in a reaction, 1 mole/liter of aqeous sodium glutamate solution was prepared as an aqueous amino acid solution by suspending L-glutamic acid in water and adding 6 moles/liter of sodium hydroxide to the suspension to a pH of 8 to dissolve the glutamic acid. The same procedure as in Example 1 was performed with the exception of using the glutamic acid solution, conducting the reaction at a temperature of 60°±1° C. and at a pH of 10.9±0.1 with a residence time of 5.9 hours and adjusting the flow rates of 2 moles/liter of aqueous nickel sulfate solution and the sodium glutamate solution so as to maintain the molar ratio of the glutamic acid to the nickel at 0.055. The residual nickel concentration of the mixture in the reactor was 150 mg/liter. The nickel hydroxide obtained was 2.02 g/ml in tapping density, 1.17 deg in the half value width of the (101) plane as determined by X-ray diffraction and 10 to 30 μm in particle size as determined from the particle size distribution obtained by the laser method. FIG. 3 is a scanning electron photomicrograph (SEM, ×350 in magnification) of nickel hydroxide particles obtained.

EXAMPLE 20

The same procedure as in Example 1 was performed with the exception of using an aqueous solution of 1 mole/liter of monosodium L-aspartate monohydrate, conducting the reaction at a temperature of 60°±1° C. and at a pH of 11.0±0.1 with a residence time of 5.9 hours and adjusting the flow rates of 2 moles/liter of aqueous nickel sulfate solution and the monohydrate solution so as to maintain the molar ratio of the aspartic acid to the nickel at 0.040. The residual nickel concentration of the mixture in the reactor was 250 mg/liter. The nickel hydroxide obtained was 2.00 g/ml in tapping density, 1.06 deg in the half value width of the (101) plane as determined by X-ray diffraction and 10 to 30 μm in particle size as determined from the particle size distribution obtained by the laser method.

Table 3 below shows the specific surface areas, determined by the BET method, of the nickel hydroxides obtained in the examples of the invention.

TABLE 3

| Ex. | Specific surface area ($m^2/g$) | Ex. | Specific surface area ($m^2/g$) |
| --- | --- | --- | --- |
| 1 | 26.7 | 10 | 43.3 |
| 2 | 32.9 | 11 | 35.2 |
| 3 | 36.9 | 12 | 39.2 |
| 4 | 22.8 | 13 | 44.2 |
| 5 | 30.9 | 14 | 44.7 |
| 7 | 36.1 | 18 | 53.5 |
| 8 | 40.9 | 19 | 59.2 |

Spherical particles of nickel hydroxide which have a high density, great specific surface area and low crystallinity and which are made highly uniform in these properties can be stably produced according to the invention.

What is claimed is:

1. A process for producing nickel hydroxide particles for a positive electrode material for alkali secondary batteries comprising continuously supplying an aqueous solution containing a nickel salt and an aqueous solution of an amino acid or salt thereof to a reactor at the same time and supplying an aqueous solution of an alkali metal hydroxide to the reactor so as to maintain the pH of the mixture in the reactor within ±0.1 of a specified value in the range of 9 to 12 to thereby form nickel hydroxide particles having a particle size of 2 to 50 μm, a tapping density of 1.5 to 2.2 g/ml, a half width of the (101) plane as determined by X-ray diffraction of 0.8 to 1.25 deg and a specific surface area as determined by the BET method of 20 to 70 $m^2/g$.

2. A process for producing nickel hydroxide particles as defined in claim 1 wherein an aqueous solution containing at least one salt selected from the group consisting of a cobalt salt, cadmium salt and zinc salt is further added to the aqueous solution containing a nickel salt.

3. A process for producing nickel hydroxide particles as defined in claim 1 wherein the amino acid is selected from the croup consisting of glycine, α-alanine, β-alanine, glutamic acid and glycylglycine.

4. A process for producing nickel hydroxide particles as defined in claim 1 wherein the nickel hydroxide is 10 to 30 μm in particle size, 2.0 to 2.2 g/ml in tapping density, 0.9 to 1.25 deg in the half width of the (101) plane as determined by X-ray diffraction and 30 to 70 $m^2/g$ in specific surface area as determined by the BET method.

5. A process for producing nickel hydroxide particles as defined in claim 1 wherein the mixture in the reactor is maintained within ±2° C. of a specified reaction temperature in the range of 20° to 80° C.

* * * * *